United States Patent
Solberg

[11] Patent Number: 6,003,873
[45] Date of Patent: Dec. 21, 1999

[54] J-TUBE SEAL

[75] Inventor: Lars Aksel Solberg, Oslo, Norway

[73] Assignee: Alcatel, France

[21] Appl. No.: 09/083,709

[22] Filed: May 22, 1998

[30] Foreign Application Priority Data

Jun. 6, 1997 [NO] Norway .................................. 972578

[51] Int. Cl.⁶ .................................................. F16L 5/02
[52] U.S. Cl. .......................... 277/323; 277/316; 277/605;
277/609; 277/627; 405/169
[58] Field of Search .................. 285/294.1–4, 296.1,
285/345; 277/316, 319, 320, 323, 330,
603, 605, 607, 609, 626, 627; 166/127,
132, 135

[56] References Cited

U.S. PATENT DOCUMENTS

| 50,194 | 9/1865 | Wilder | 277/330 |
|---|---|---|---|
| 4,268,041 | 5/1981 | Sovish | 277/607 |
| 4,332,975 | 6/1982 | Dienes . | |
| 4,622,436 | 11/1986 | Kinnan | 277/620 |
| 5,118,454 | 6/1992 | Preston | 264/36 |
| 5,564,716 | 10/1996 | Onoue | 277/607 |

FOREIGN PATENT DOCUMENTS

| 142039 | 11/1975 | Norway . |
|---|---|---|
| 760153 | 7/1976 | Norway . |
| 7601581-7 | 8/1976 | Sweden . |
| 2188999B | 10/1987 | United Kingdom . |
| 2281365A | 3/1995 | United Kingdom . |
| 2297593A | 8/1996 | United Kingdom . |

Primary Examiner—Anthony Knight
Assistant Examiner—Vishal Patel
Attorney, Agent, or Firm—Ware, Fressola, Van der Sluys & Adolphson LLP

[57] ABSTRACT

The present invention relates to a method and device for sealing the entrance of an elongated element (1) into the lower end of an offshore tube (8), —including the steps of arranging a plug-like device (2) on the element, —pulling a predetermined length of the element into the tube, —and fixing the plug on the element surface at the bellmouth entrance (7) of the tube, the outer diameter of the plug being somewhat smaller than the inner diameter of the tube. Expandable foam is injected to a space (11,12) between the outer surface of the plug (2) and the inner surface of the tube (8), —in order to substantially fill said space.

The foam is supplied to the space (11,12) from at least one foam container (15) placed inside the plug, —via ducts (13,14) within the plug. The foam container (15) is operated from a drive gas cartridge (16) also arranged within the plug (2) and is operable by an ROV.

11 Claims, 1 Drawing Sheet

J-TUBE SEAL

BACKGROUND OF THE INVENTION

1. Technical Field

The present invention relates to a sealing device or plug for sealing off a elongated element, such as an cable, a pipe or an umbilical, at its entrance into an apparatus, in particular at the lower horizontal end of an offshore J-tube, leading from the sea bed up to a platform structure. The sea bed may be several hundred meters below the sea level.

2. Description of the Prior Art

In some cases it is desirable, after a elongated element has been installed within an J-tube, that the sea water surrounding the element within the J-tube is deoxidized to prevent or reduce corrosion of the element and of the inner walls of the tube. In order to neutralize the sea water in the tube, inhibiting agents are added to the water, and the inside pressure is normally some 5–6 bar more than the pressure of the surrounding water. A problem arises, however, due to difficulties in obtaining a full seal between the surface of the elongated element and the tube entrance. If the seal is poor,—the external sea water will be gradually exchanged with the inhibited sea water within the tube. A suitable sealing device should also prevent pollution that might be caused by leaking inhibiting agents into the sea.

From GB 2 188 999 B, there is known a sealing device or plug comprising at least two elements which are arranged to be pressed against each other, against a circumference of the elongated element and against the aperture of said apparatus. At least one of the elements is hinged to the apparatus In GB 2 281 365 A, a sealing device or plug comprises centralizing means arranged around the elongated element inside a pull-in-flange at the lower entrance of the J-tube, sealing means arranged around the elongated element next to the centralizing means, and formed as a one-piece split annulus, the split being in a plane substantially parallel to the axis of the annulus and to the axis of the elongated element, and pressure means for pressing the sealing means to sealing contact against the elongated element, against the flange surface and against the centralizing means In GB 2 297 59 A, a sealing device or plug consists of two substantially identical parts or halves which are hinged together along an axis substantially parallel to the axis of the elongated element, each half comprising a centralizer part, a sealing part and tensioning parts capable of pressing the sealing means to sealing contact against the elongated element, against the inner surface of the J-tube and against the centralizing means. There are described means for interlocking the two halves with each other and interlock the device with a bellmouth flange. There are also described separate interlockable two-part means for exerting a certain friction against the surface of the elongated element when the sealing parts are interlocked but not yet tensioned.

The technical problem is—as mentioned—to provide a reliable seal at the subsea entrance of an elongated element into a socalled J-tube bellmouth. The prior art solutions all rely on compression of rubber gaskets to obtain a suitable seal, but when the inside of the J-tube is rough it is difficult to obtain a good seal.

SUMMARY OF THE INVENTION

The main object of the present invention is to provide an alternative efficient full seal at the subsea entrance of a J-tube, —even if the inner surface of the tube is rough. The basic idea is to provide sealing by injecting an expanding foam into space provided between a sealing device and the J-tube.

It is well known from prior art such as U.S. Pat. No. 4,332,975 to provide a sealed cable closure by filling a cavity with an expandable foam like polyurethane resin. With the present invention, however, there is obtained an efficient sealing device which may be installed operated at subsea installations by an ROV.

Above mentioned and other features and objects of the present invention will clearly appear from the following detailed description of embodiments of the invention taken in conjunction with the drawings.

DETAILED DESCRIPTION OF THE INVENTION

Figure 2:
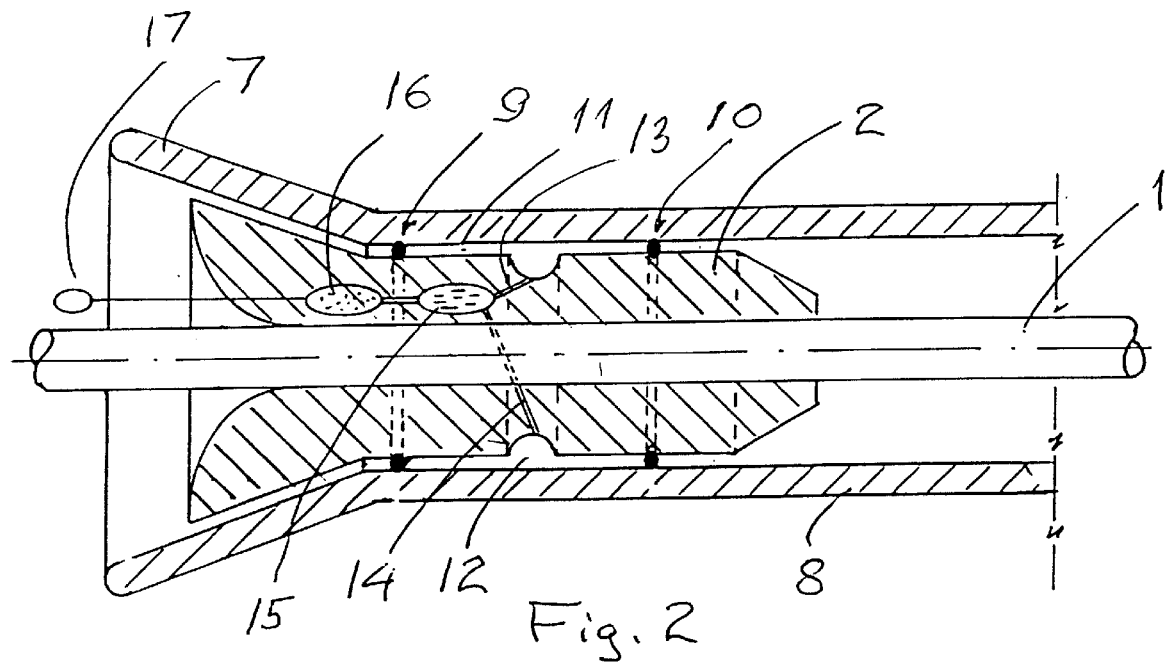
Figure 1:
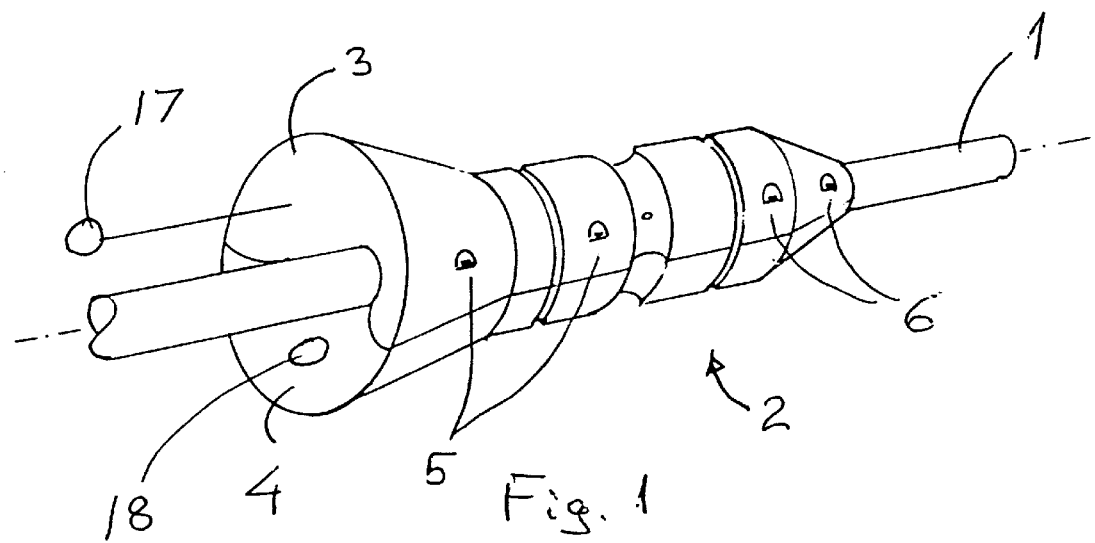
FIG. 1 is a perspective view of a sealing device installed on an elongated element, and FIG. 2 a cross-section view of a sealing device installed within a J-tube bellmouth.

In FIGS. 1 and 2 are shown an elongated element 1 and a sealing device 2 or plug installed on the element. The sealing device consists of two parts 3 and 4. The parts 3 and 4 may be interconnected with a number of bolt arrangements 5 and 6. This sealing device 2 may be arranged to be interlocked with a bellmouth flange 7 of a J-tube 8 and there may be provided a friction device (not shown) for facilitating adjustment of the sealing device along the elongated element before initiating the sealing process.

The installation of the elongated element and of the sealing device can be performed as follows:

Before the elongated element 1 is lowered to the sea bed for insertion and pulling into the J-tube 8, the sealing device 2 is installed on the elongated element. The dimensions can be chosen such that the interconnected parts 3 and 4 may slide freely on the surface of the elongated element 1 and freely within the J-tube 8, whereas a friction element can prevent uncontrolled axial movements of the sealing device on the surface of the elongated element.

The elongated element 1 with the sealing device 2 is now carefully lowered from the cable ship to the subsea entrance of the J-tube 8. The end of the elongated element is pulled into and up through the J-tube to a topside termination and installation (not shown). The sealing device 2 is installed within the J-tube 8 at any time during installation of the elongated element within the J-tube, and catching means (not shown) may catch the J-tube flange 7. As soon as the desired position of the elongated element within the J-tube and sealing device is obtained, the sealing process of the present invention may be initiated.

The device or plug 2 may be provided with rubber seals 9 and 10 in order to define a compartment 11 between the plug surface and the J-tube surface. The concentrical plug 2 may be provided with at least one circumferential groove 12 provided in its outer surface between the rubber seals 9 and 10. The plug parts may be made of nylon or other convenient material. Internal ducts 13 and 14 are leading to the groove 12 and the compartment 11 from at least one foam cartridge 15 which is fitted into a cavity in one or both halves. The foam cartriges may be of the two component type. The foam cartriges may be interconnected with a cartrige 16 containing $CO_2$ or similar agents for expulsion of the foam. The cartridge may be triggered by an ROV operating a handle 17. The foam produced by the foam cartridge 15 will then be led via the ducts 13 and 14 in the plug 2 to seal the space 11 between the plug 2 and the J-tube wall 8. The pressure exerted by the gas and foam must be high enough to overcome and press out the water contained in the compartment 11 to begin with. Ducts (not shown) leading from the compartment 11 to a membrane 18 at the salt water side of the plug may be provided to show that the release has worked properly.

A good seal—preventing leakage of corrosion inhibiting fluids from the J-tube,—also when the inside walls of the tube is rough,—is thereby obtained. This sealing method and means for sealing may be provided as indicated above as a standalone sealing process or it can be provided in addition to sealing means described in our mentioned GB 2 188 999, GB 2 281 365 and GB 2 297 593.

The above detailed description of embodiments of this invention must be taken as examples only and should not be considered as limitations on the scope of protection.

I claim:

1. Method for sealing an entrance of an offshore tube with an elongated element therein comprising the steps of:

(a) arranging a plug-like device on the element, an outer diameter of the plug-like device being smaller than an inner diameter of the tube;

(b) pulling a predetermined length of the element into the tube;

(c) fixing the plug-like device on the element at the entrance of the tube creating a space between an outer surface of the plug-like device and an inner surface of the tube; and (d) injecting an expandable foam to the space between the outer surface of the plug-like device and the inner surface of the tube in order to substantially fill the space.

2. Method according to claim 1, wherein the foam is supplied to the space from at least one foam container inside the plug-like device.

3. Method according to claim 2, wherein the foam is supplied to the space via ducts within the plug-like device.

4. Method according to claim 3, wherein the at least one foam container is operated by a drive gas cartridge arranged within the plug-like device.

5. Method according to claim 4, wherein the cartridge is operable by a remote operated vehicle.

6. Method according to claim 2, wherein the at least one foam container is operated by a drive gas cartridge arranged within the plug-like device.

7. Method according to claim 6, wherein the cartridge is operable by a remote operated vehicle.

8. Means for sealing an entrance of an offshore tube with an elongated element therein, comprising:

a plug-like device adapted to be fixed on an outer surface of the element at the entrance of the tube, an outer diameter of the plug-like device being smaller than an inner diameter of the tube so as to create a space between an outer surface of the plug-like device and an inner surface of the tube, the plug includes at least one expandable foam container arranged to introduce expandable foam into the space, a remote operated vehicle operatable gas cartridge arranged to operate the at least one foam container and internal ducts for leading the expandable foam to the space provided between the plug-like device and the tube.

9. Means according to claim 8, wherein the outer surface of the plug-like device is provided with at least one cylindrical groove which is filled with foam via the ducts upon operation of the cartridge.

10. Means according to claim 8, wherein the plug-like device is provided with rubber seals to define a compartment within the space between the plug-like device and the tube.

11. Means according to claim 10, wherein the plug-like device includes ducts leading from the compartment to a membrane at a salt water side of the plug-like device in order to indicate proper foam release.

* * * * *